US008826211B1

(12) United States Patent
Sood et al.

(10) Patent No.: US 8,826,211 B1
(45) Date of Patent: Sep. 2, 2014

(54) GRAPHICAL USER INTERFACE FOR PHYSICALLY AWARE CLOCK TREE PLANNING

(71) Applicant: Cadence Design Systems, Inc., San Jose, CA (US)

(72) Inventors: Ankush Sood, San Jose, CA (US); Aaron Paul Hurst, San Francisco, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/839,769

(22) Filed: Mar. 15, 2013

Related U.S. Application Data

(60) Provisional application No. 61/732,284, filed on Nov. 30, 2012.

(51) Int. Cl.
*G06F 17/50* (2006.01)
(52) U.S. Cl.
USPC ............................................................ 716/113
(58) Field of Classification Search
USPC ............................................................ 716/113
See application file for complete search history.

(56) References Cited

U.S. PATENT DOCUMENTS

| 2009/0199143 A1* | 8/2009 | Schlotman et al. ............... 716/6 |
| 2012/0023472 A1* | 1/2012 | Fischer et al. ............... 716/122 |
| 2013/0047127 A1* | 2/2013 | Arunachalam ............... 716/103 |

* cited by examiner

*Primary Examiner* — Vuthe Siek
*Assistant Examiner* — Mohammed Alam
(74) *Attorney, Agent, or Firm* — Alford Law Group, Inc.; Tobi C. Clinton; William E. Alford

(57) ABSTRACT

In one embodiment of the invention, a method for displaying and analyzing a clock gate tree topology is disclosed. The method includes displaying a bounding box of each flip-flop cluster in the floor plan of the integrated circuit; and for each flip-flop cluster, calculating the coordinates for a center of mass of the flip-flop cluster, displaying the position of the clock gate driving the flip-flops in the flip-flop cluster with respect to the center of mass of the flip-flop cluster, displaying first air lines from the enable signal gate to the clock gate with a first color, and displaying second air lines from the clock gate to the center of mass of the flip-flop cluster with a second color differing from the first color.

24 Claims, 13 Drawing Sheets

(4 of 13 Drawing Sheet(s) Filed in Color)

| Cloned CGs | 5409 (avg. 1.94x clones/enable) |
| --- | --- |
| Merged CGs | 1767 (16 %) |
| Regrouped Overlapping Clock Sub-trees | 1433 groups |
| Un-gated Flip-flops | 4806 (3.1 %) | ed, not utilized during logic synthesis of other net-
GRAPHICAL USER INTERFACE FOR PHYSICALLY AWARE CLOCK TREE PLANNING

CROSS REFERENCE

This non-provisional United States (U.S.) patent application claims the benefit of U.S. Provisional Patent Application No. 61/732,284 filed on Nov. 30, 2012 by inventors Ankush Sood, et al., entitled GRAPHICAL USER INTERFACE FOR PHYSICALLY AWARE CLOCK TREE PLANNING.

This application is also related to U.S. patent application Ser. No. 13/732,364 filed on Dec. 31, 2012 by inventors Tsuwei Ku, et al., entitled PHYSICALLY AWARE LOGIC SYNTHESIS OF INTEGRATED CIRCUIT DESIGNS, incorporated herein by reference.

FIELD

The embodiments of the invention relate generally to graphical user interfaces for designing integrated circuits.

BACKGROUND

Digital circuits within integrated circuit chips are often synchronized by one or more clock signals. Data is periodically stored in registers that are clocked by such clock signals. When data is not being evaluated, it is desirable to control or gate the clocks to unused circuitry in order to conserver power. Clock tree synthesis is thus important in assuring that data is captured when needed and that power is conserved when desired.

Traditional logic synthesis of register-transfer-logic (RTL) into Boolean logic gates provides little to no visibility into the consequences of logic implementation choices on clock synthesis. Clock synthesis is often considered at the end of the design even though decisions made in the front-end design flow of an integrated circuit may have significant consequences on the subsequent timing and power closure of the clock design and its clock tree.

Traditionally, clock signals are treated as ideal networks during logic synthesis and logic optimization. Physical information (e.g., driver size/strength, net widths, net lengths), buffering information (e.g., clock buffers, clock gating), or timing information (e.g., delay) is usually not estimated, or if estimated, not utilized during logic synthesis of other networks. It is usually during the back-end of the physical design of the overall integrated circuit design that clock synthesis occurs and any implementation details of the clock signals are explored.

For low power integrated circuit designs, estimating the costs of timing and power during automatic clock gating insertion is imprecise with such late clock synthesis. In lieu of reliable data, front-end designers typically focus on the gated flip-flop percentage. However, with the availability of advanced functional gating techniques, overly aggressive gating is an increasingly common result. Another negative consequence of clock synthesis occurring late, is the greater difficulty of grouping and cloning clock signals such that it does not correspond to the physical netlist. With fewer clock signals grouped together, clock switching power may be greater. With late clock synthesis, it may be more difficult to obtain timing closure of the integrated circuit design during clock tree synthesis.

It is desirable to provide tools to the integrated circuit designer to improve the synthesis of clock signal networks within an integrated circuit design.

BRIEF SUMMARY

The embodiments of the invention are best summarized by the claims that follow below. However, briefly, a graphical user interface (GUI) for clock tree planning and design within an integrated circuit is disclosed. A designer can select enable signals and/or clock signals to display in a layout view window of the GUI to visually focus and selectively analyze enable gates and clock gates and their respective enable and gated clock signals that are used to clock flip-flops. An IC designer may visualize the clock tree plan using the GUI to meet certain goals, such as to minimize the total average switching of clock network capacitance for example. If after viewing a layout view window, something in the clock tree plan needs changing, the IC designer/user can alter the plan. Clock tree planning can be performed earlier with early physical information that is available from logic synthesis tools such that clock tree planning may be performed in a physically aware manner and consider design trade-offs.

BRIEF DESCRIPTIONS OF THE DRAWINGS

This patent or application file contains at least one drawing executed in color. Copies of this patent or patent application publication with color drawing(s) will be provided by the Office upon request and payment of the necessary fee.

Various embodiments of the present invention taught herein are illustrated by way of example, and not by way of limitation, in the figures of the accompanying drawings, in which.

FIGS. 3, 4, and 5A-5B are exemplary portions of clock tree layouts for an integrated circuit chip displayed in layout view windows on a display device by the graphical user interface.

Figure 4:
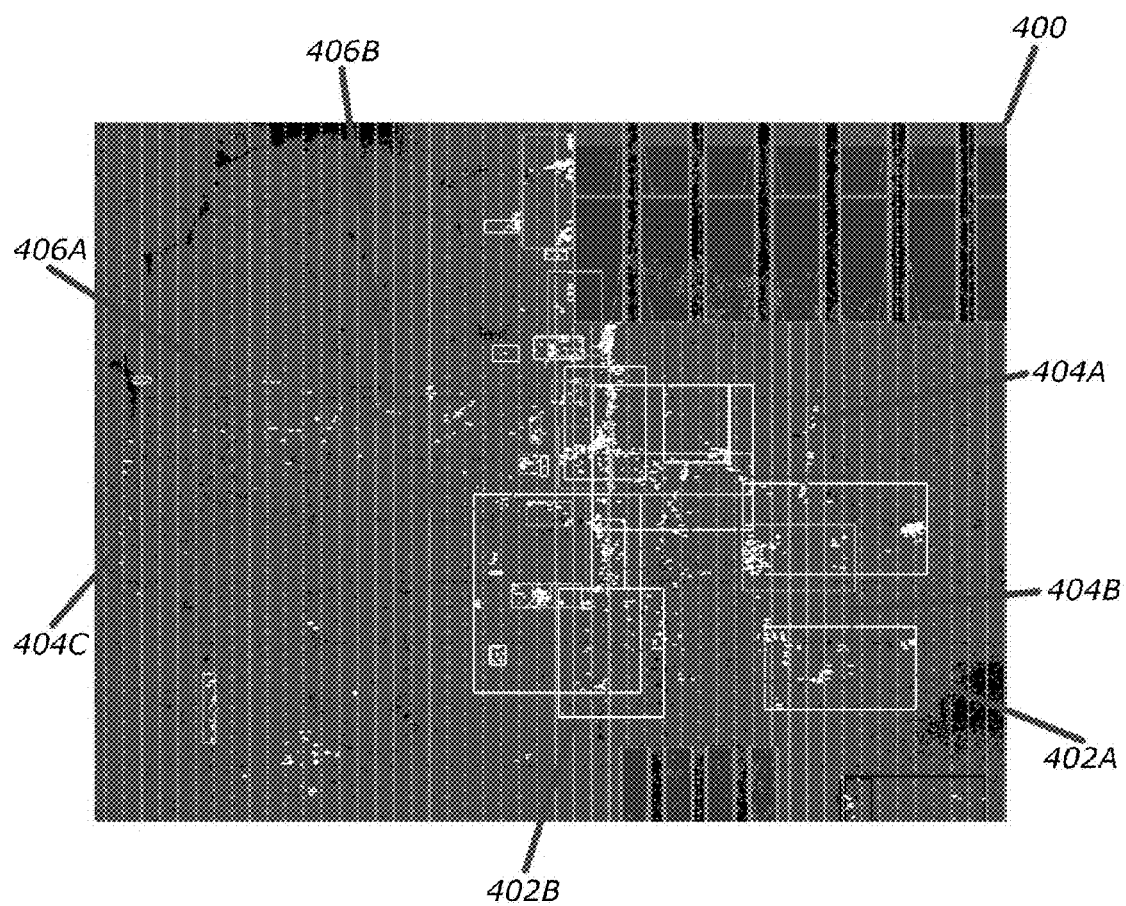
Figure 5A:
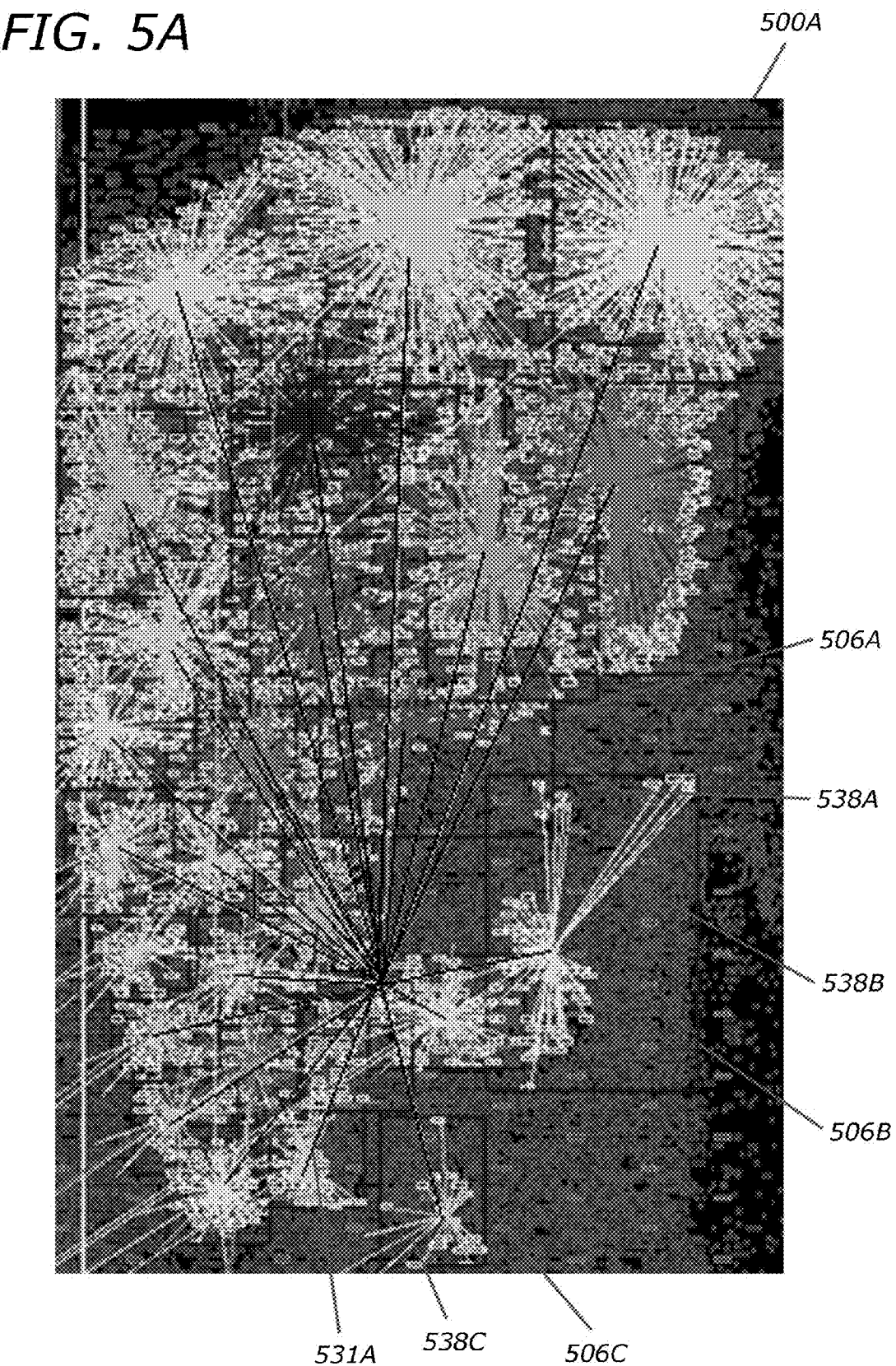
Figure 5B:
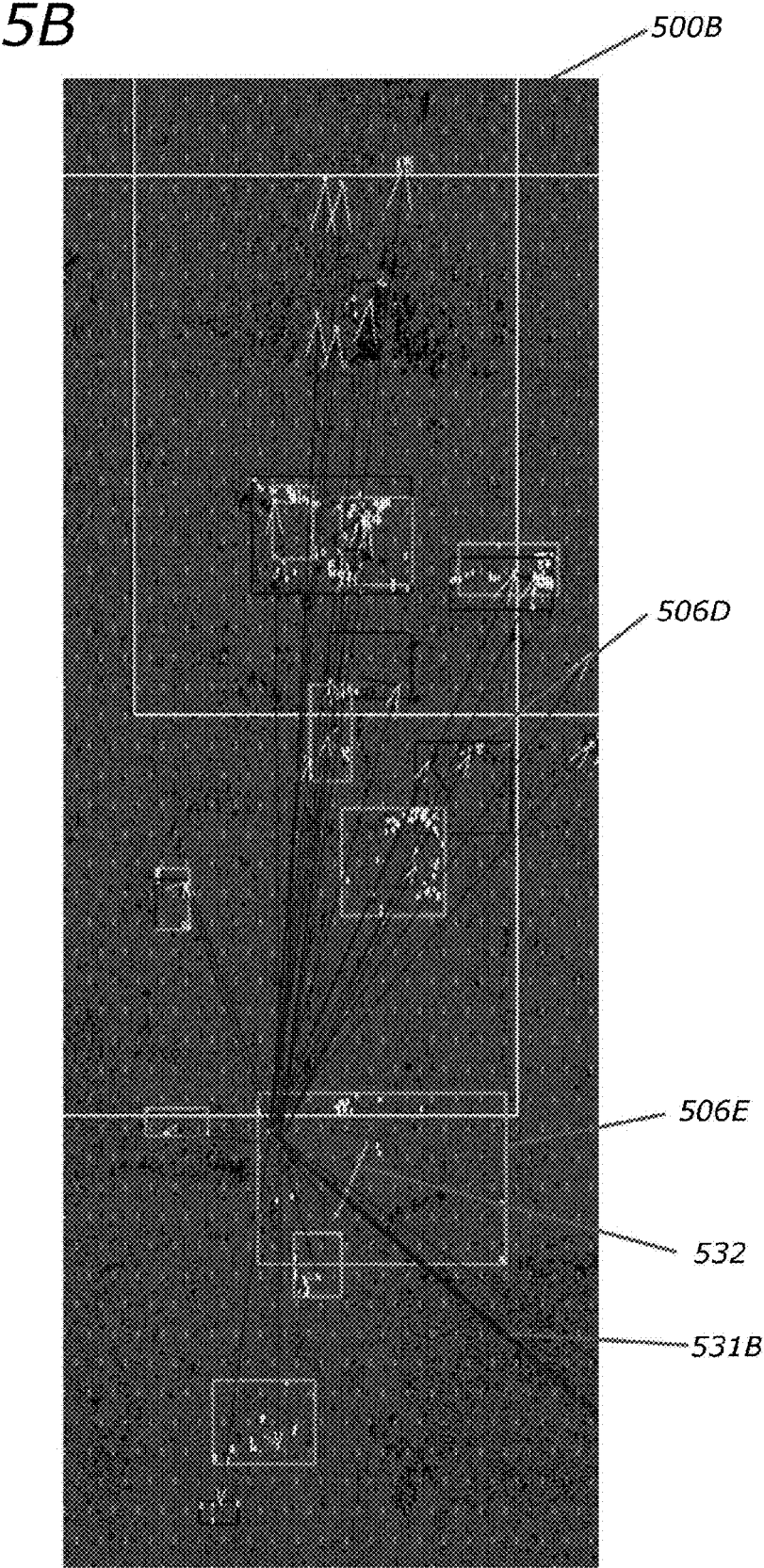
Figure 6A:
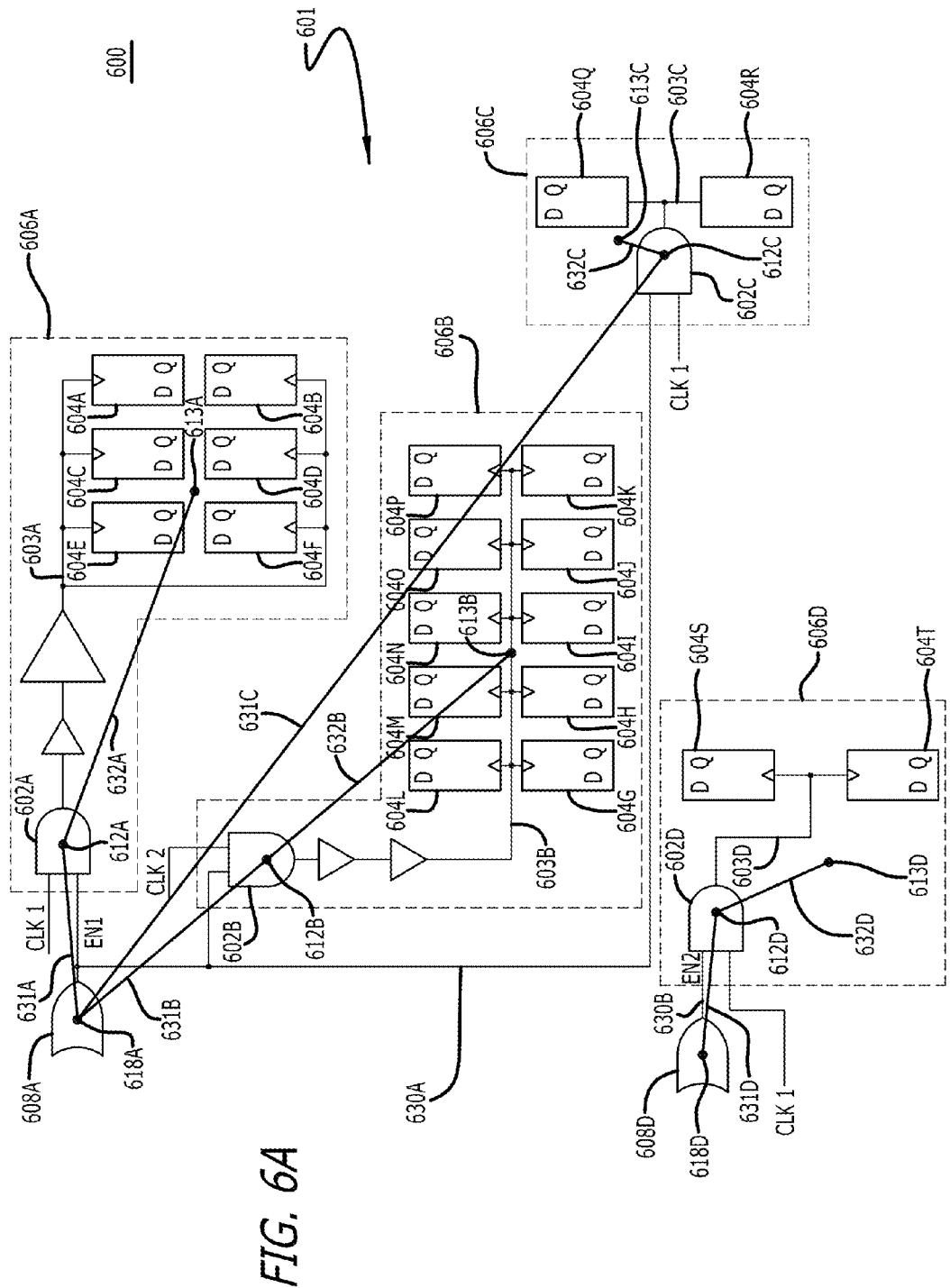
Figure 6B:
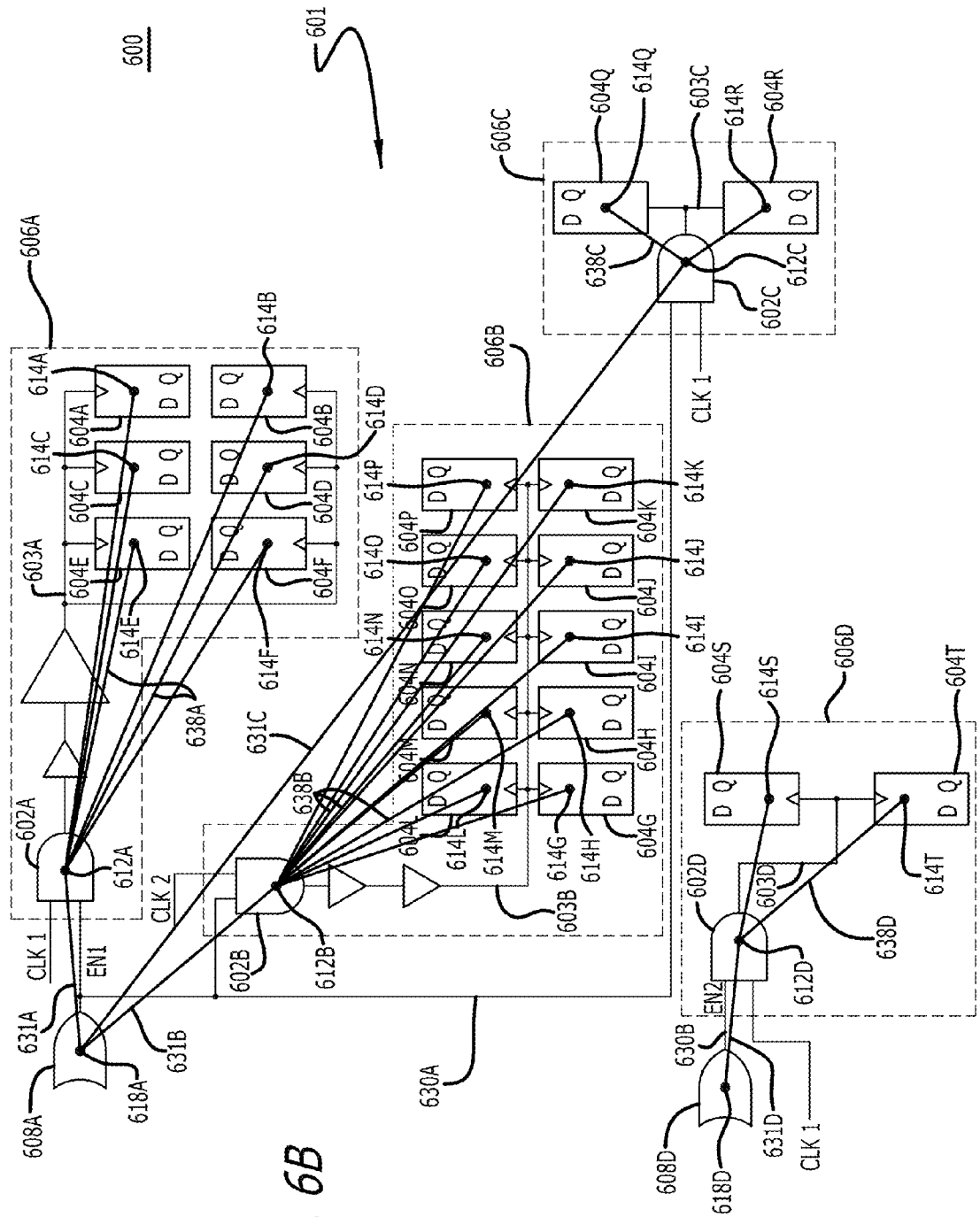

FIG. 6A-6B are schematic diagrams of exemplary circuits with examples of the various air lines that may be used to illustrate the graphical objects displayed in the layout view windows of FIGS. 3, 4, and 5A-5B.

Figure 7A:
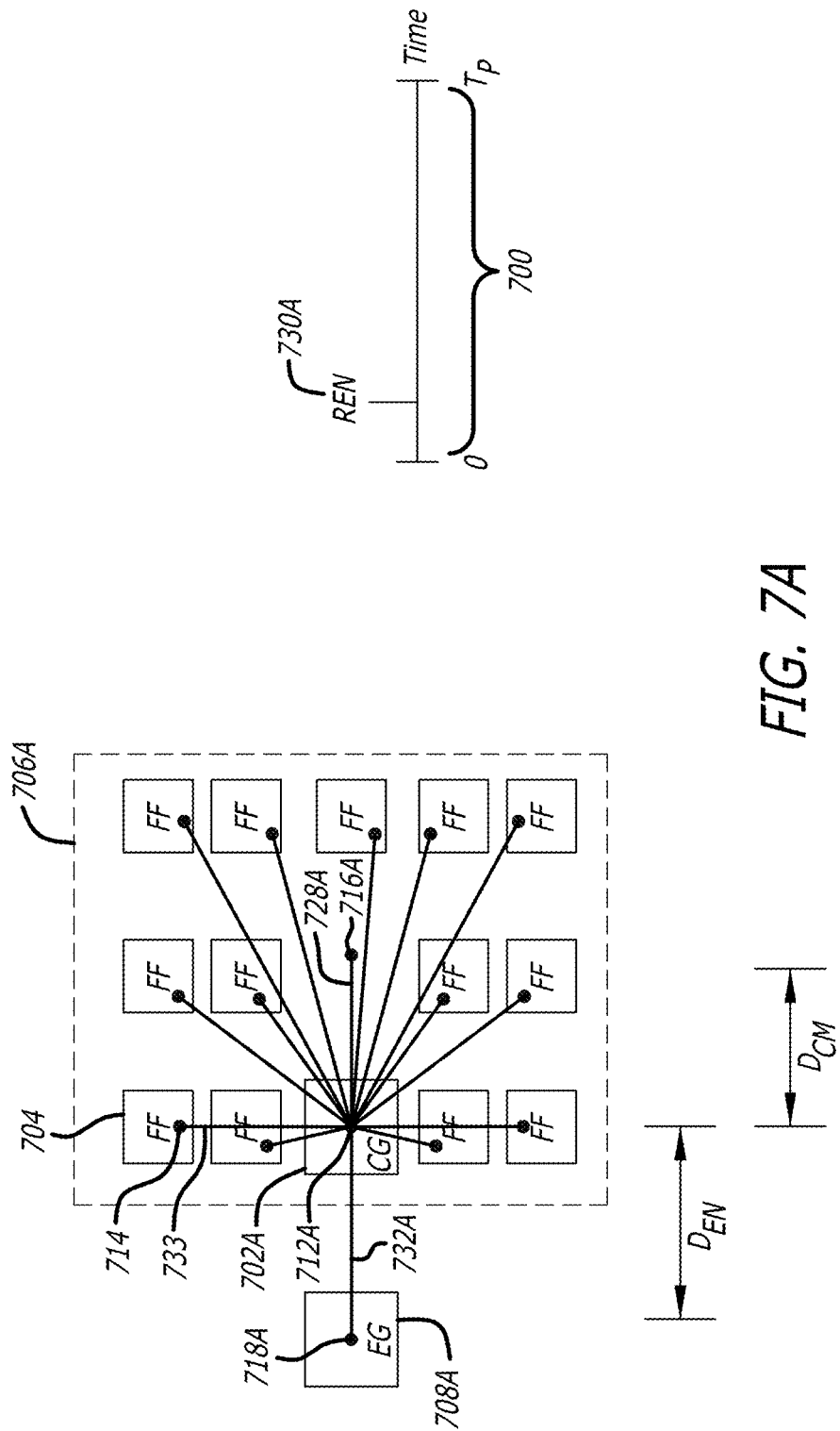
Figure 7B:
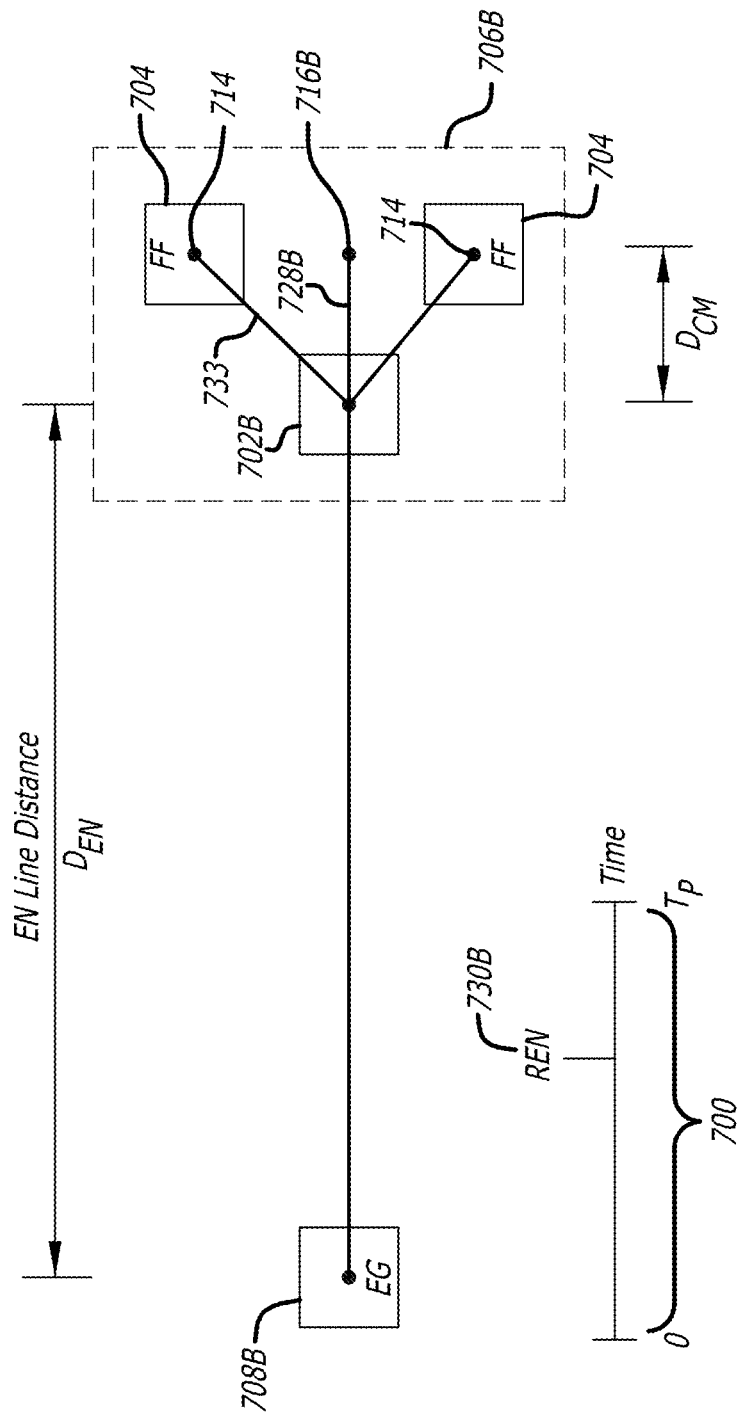

FIGS. 7A-7B are functional block diagrams to illustrate balancing of time delays and clock gate placement from an enable gate.

Figure 8:
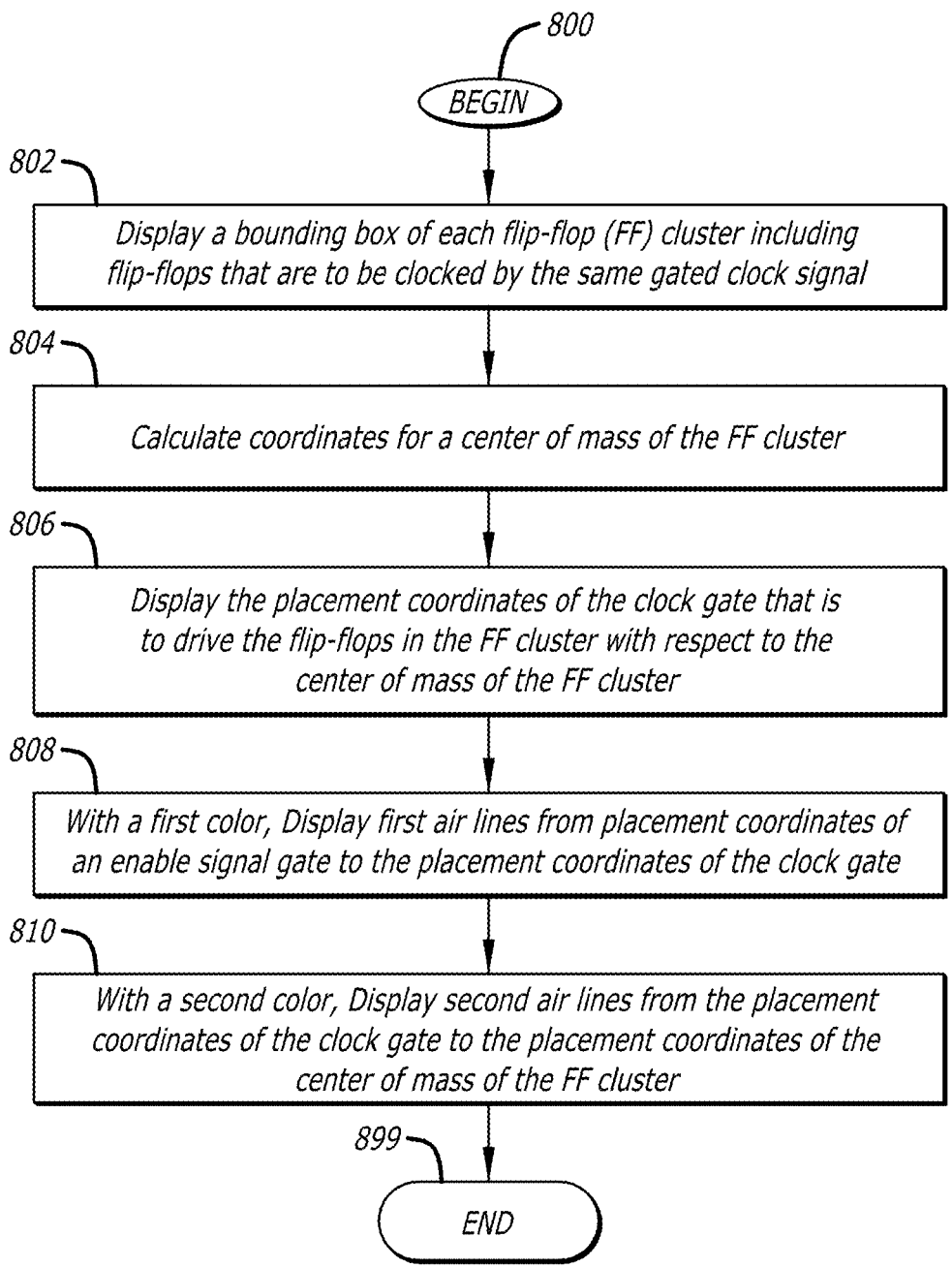

FIG. 8 is a flow chart diagram depicting an exemplary process associated with the graphical user interface to perform clock tree planning and display the layout of the clock tree.

It will be recognized that some or all of the Figures are for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Note also that the terms flip-flop and register are being used interchangeably. That is, each reference to a flip-flop herein also means a register of a plurality of flip-flops that are clocked together by the same clock signal. In a register, each flip-flop typically has a data input coupled to a respective data signal to store data bits from a bus of parallel data signals. Accordingly, a reference to a flip-flop herein also means a register of a plurality of flip-flops. A reference to one or more flip-flops herein also means one or more registers. A reference to a plurality of flip-flops herein also means a plurality of registers. A reference to a flip-flop cluster, a set of one or more independent flip-flops each being clocked by the same clock signal, also means a register cluster, a set of one or more independent registers each being clocked by the same clock signal. Conversely, a reference to a register herein also means a single flip-flop.

The embodiments of the invention include a method, apparatus and system for a graphical user interface (GUI) for physically aware clock tree planning The GUI for physically aware clock tree planning allows the IC designer user to make better design choices in clock logic implementation. The clock tree plan can be visualized in a layout view window using colorized objects. A user can select enable signals or clock signals to display in order to focus the visual analysis on select gated clock signals that are used to clock flip-flops. If after viewing a layout view window, something in the clock tree plan needs changing, the IC designer/user can alter the plan. For example, clock gating enables may be modified, combined, cloned, re-placed, or re-synthesized as needed. An IC designer may have view the clock tree plan with a goal such as to minimize the total average switching of clock network capacitance for example. Clock tree planning can be performed earlier with early physical information that is available from logic synthesis tools such that clock tree planning may be performed in a physically aware manner and consider design trade-offs.

Introduction

Figure 1A:
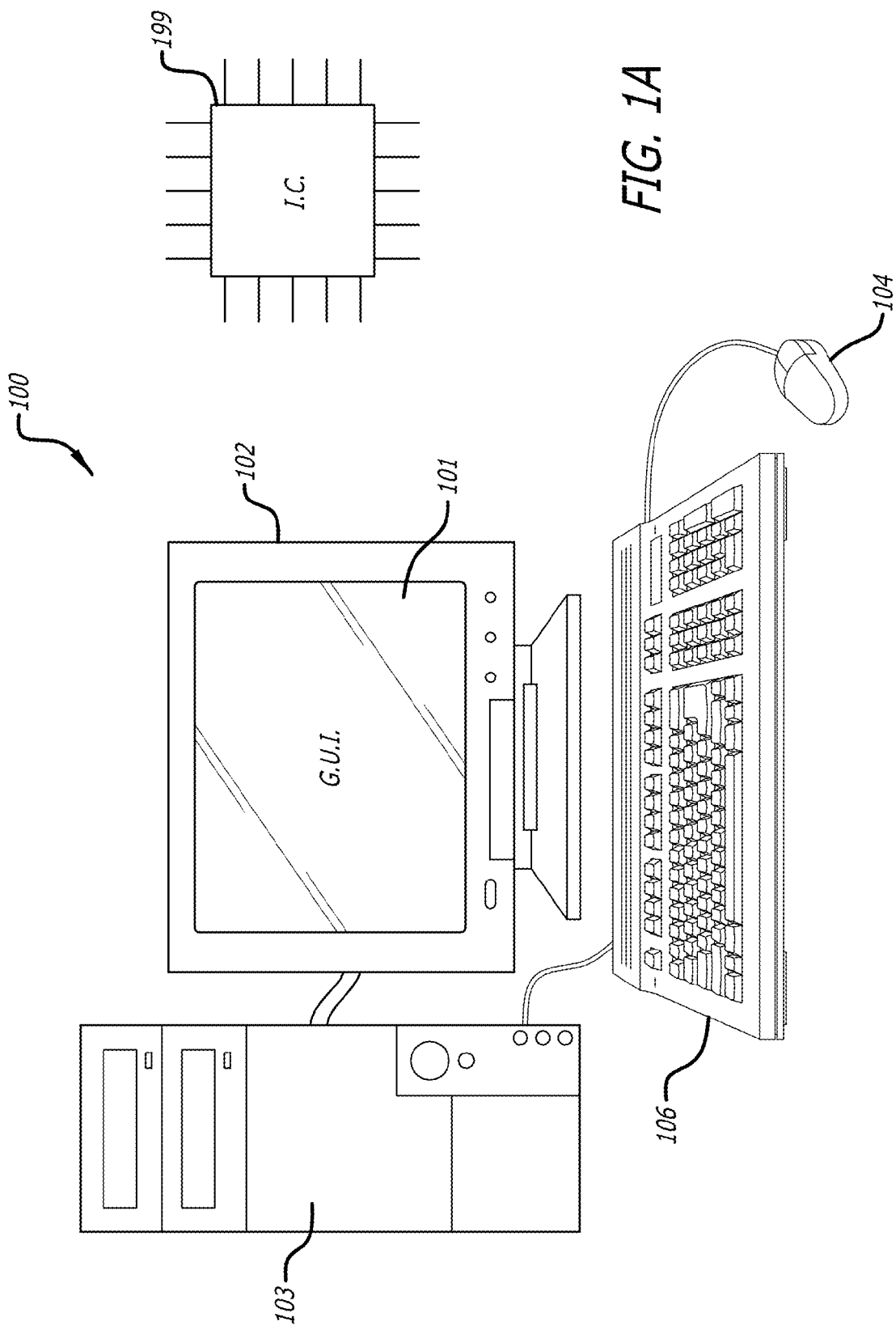
FIG. 1A illustrates a computer system with a clock tree planning graphical user interface, in accordance with embodiments of the invention, displayed by a display device that may be used to design integrated circuits.
Figure 1B:
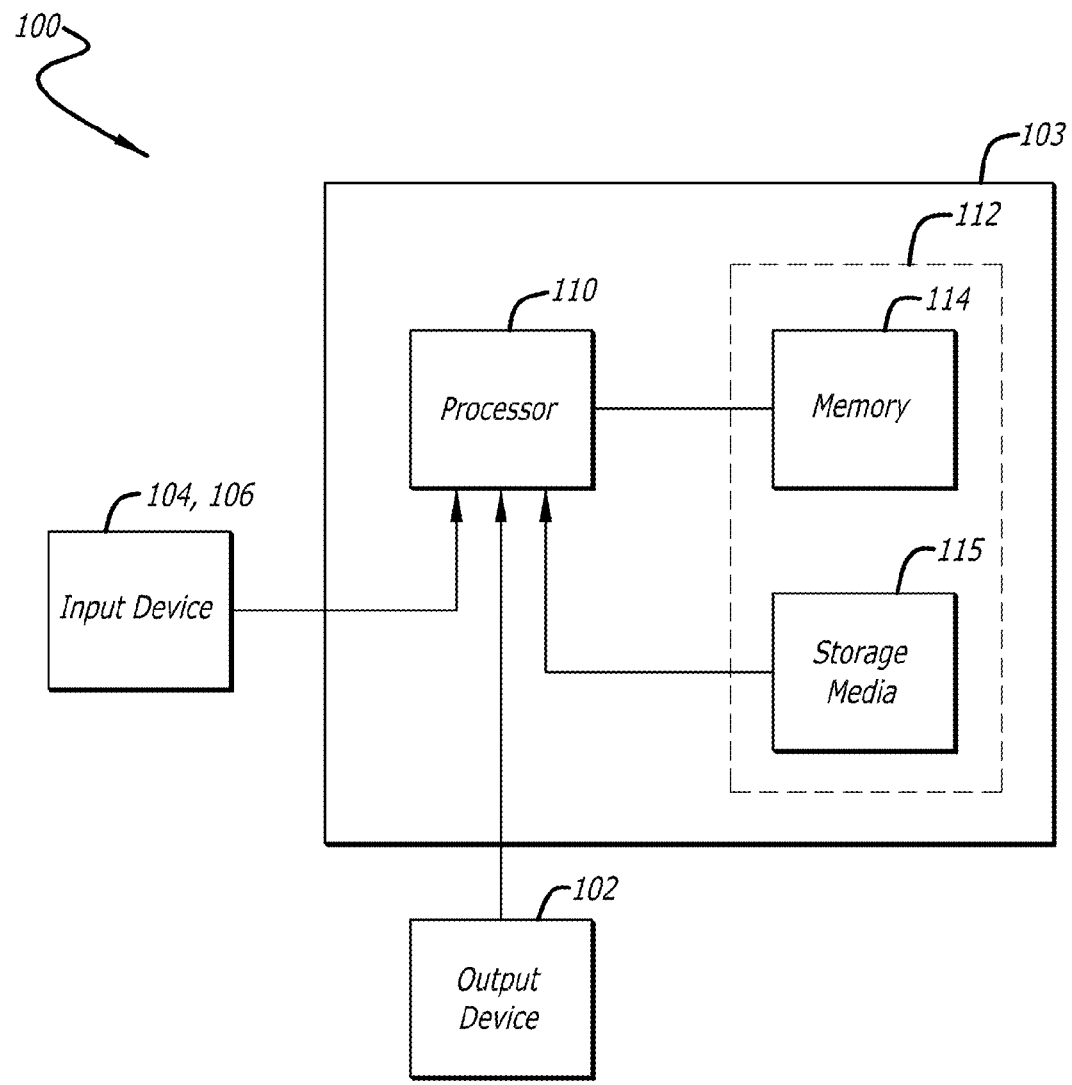
FIG. 1B is a functional block diagram of the computer system that executes the instructions to display the clock tree planning graphical user interface that may be used to design integrated circuits.

Referring now to FIG. 1A, a computer system 100 is illustrated for designing an integrated circuit 199. In accordance with the embodiments of the invention, the computer system 100 includes a central processing unit (CPU) 103 to execute instructions of a software program to display a graphical user interface (GUI) 101 on an output device 102 (e.g., a display device or monitor). The computer system 100 further includes at least one input device 104, such as a mouse or trackpad, to interact with the GUI 101. The input device 104 may be directly coupled to the CPU 103 or may couple the CPU through a second input device 106, such as a keyboard. FIG. 1B, described further below, illustrates a functional block diagram of the computer system 100 to execute instructions of the software program and display the graphical user interface 101 to a user for clock tree topology planning Referring now to FIG. 1C, a block diagram illustrates the windows, objects, and user selectable inputs of the graphical user interface (GUI) 101 that may be provided by the clock tree planning software when executed by a processor. The GUI 101 may include one or more layout viewer windows 150A-150B to display various magnifications of portions of clock tree in the layout of an integrated circuit design. The GUI 101 may further include an enable select button 152 with a menu of the enable signals, including all or none, that may be selected by a user for display in a respective layout view window. The GUI 101 may further include a clock select button 154 with a menu of the clock signals, including all or none, that may be selected by a user for display in a respective layout view window. The GUI 101 may further include a statistics window 156 to display statistics of the clock tree displayed in a layout view menu responsive to the enable and select buttons 152,154 and enable and clock signals that are desired to be displayed.

Figures 1C, 1D:
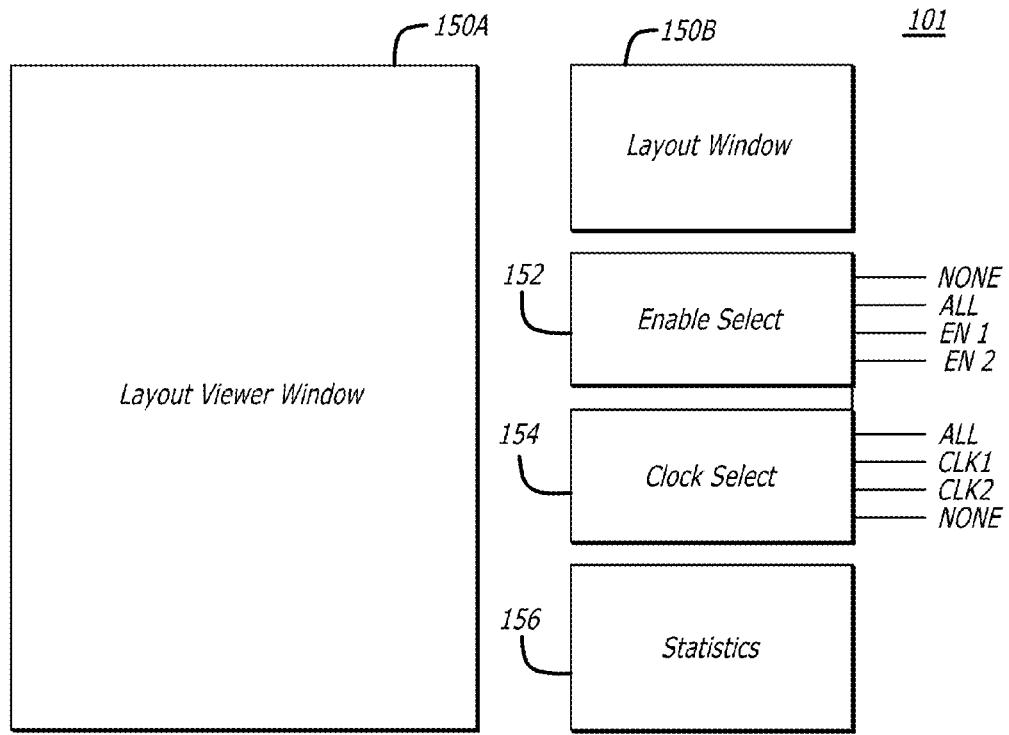
FIG. 1C is a schematic diagram of the elements of a clock tree planning graphical user interface that may be displayed on a display device of a computer system.
FIG. 1D is a table of statistics that may be displayed by the clock tree planning graphical user interface.

FIG. 1D illustrates an exemplary table of statistics 156. The table of statistics 156 may include the number of cloned clock gates, the number of merged clock gates, and the number of regrouped overlapping clock sub-trees provided by the clock tree planning, as well as the number of un-gated flip-flops that are directly clocked by a clock signal.

Figure 2:
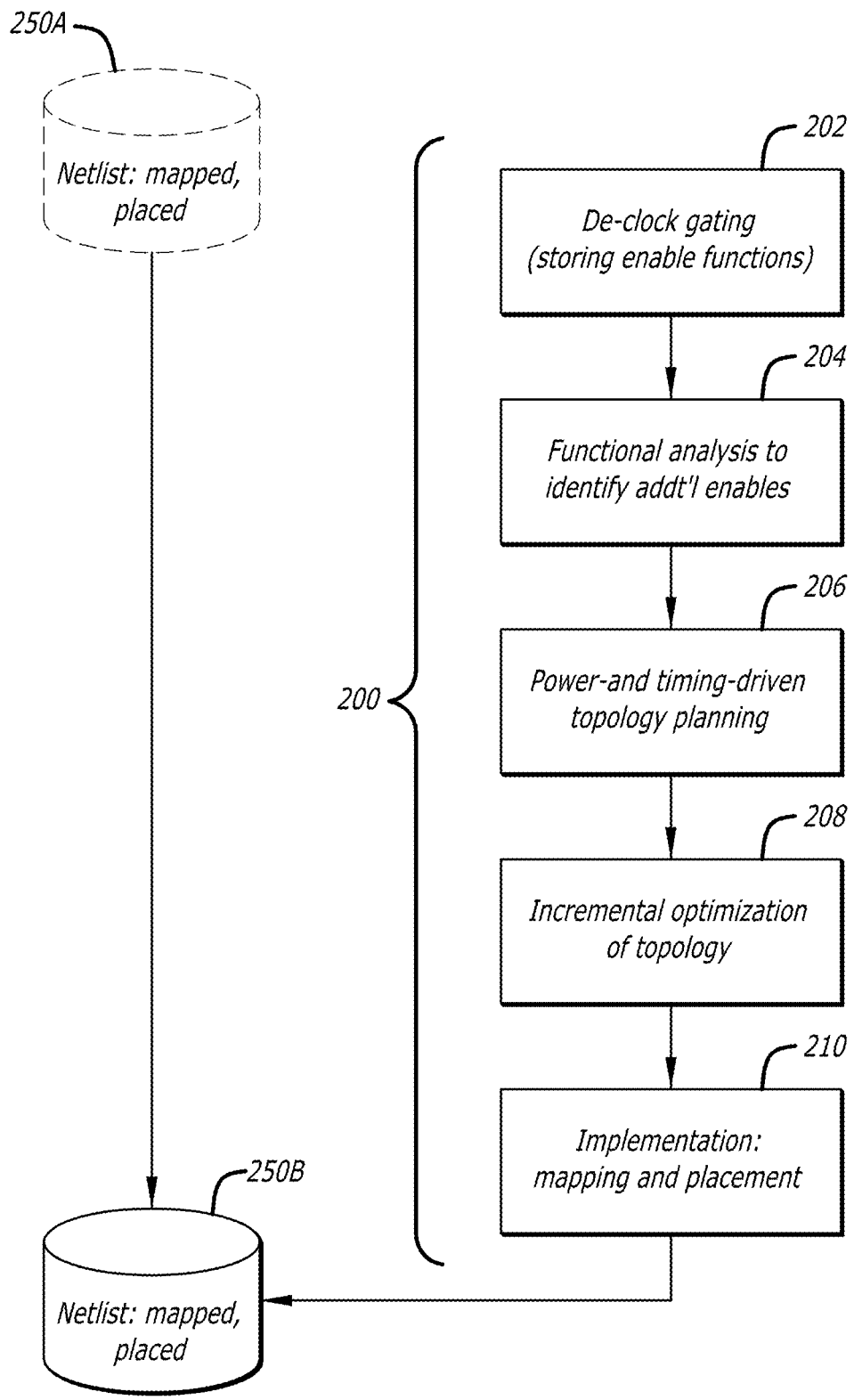
FIG. 2 is an exemplary flow diagram for clock topology planning

Referring now to FIG. 2, an exemplary flow diagram of clock tree synthesis 200 is illustrated. The position of block 250A above clock tree synthesis 200 illustrates the logic of an integrated circuit design, but for clock signal logic, being synthesized (mapped and placed) before the clock tree synthesis 200 occurs. The embodiments of the invention allow clock tree synthesis 200 to occur in conjunction with or even prior to the logic synthesis of the functional logic (e.g., data path logic and control logic) of the integrated circuit design. This is illustrated by block 250A moving down to be even with the implementation process 210 in the clock tree synthesis flow 200.

Prior IC design methodologies performed clock tree synthesis (CTS) as part of the implementation flow after the rest of the IC design had been synthesized and placed. In this case, there is little to no visibility into the effects of design choices on clock synthesis—despite the fact that decisions made early in the IC design flow may have significant consequences on the subsequent timing closure and power closure during the design of the clock tree to generate the clock signals for functional blocks.

Clock tree planning (CTP) with the assistance of the GUI described herein can occur earlier in the IC design flow so that the characteristics of the clock distribution network and its related components are better understood so that problems faced in the prior art may be avoided. In FIG. 2, this is illustrated by the block 250A moving towards the position of block 250B along the processes of clock tree synthesis 200.

The GUI described herein may be used in advance of clock tree implementation so that the performance, power consumption, or other desired characteristics of the clock tree may be improved when the clock tree plan is finally implemented as a physical layout.

Clock topology planning, also referred to as clock tree planning, is a framework to provide early estimation and optimization of a clock network that generates clock signals within an integrated circuit design. The focus during clock tree planning is on the topology of the clock network, the functionality of the clock network, and placement of clock gates, enable gates, buffers, and flip-flops to balance timing to the flip-flops and meeting power and timing requirements.

Power consumption in an integrated circuit can be greatly influenced by a clock network. If there are accurate estimates of the distributional elements in a clock tree, a more accurate estimate of the parasitic capacitance that is switched may be had. Furthermore, a determination may be made as to whether or not the insertion of a particular clock gate to generate a clock signal will yield a net power savings and should be implemented or rejected.

In the physical domain, clock gating can be driven by the placement of the clock sinks, such as the placement of the latches, flip-flops, and registers. Cloning, the act of duplicating circuits to generate a clock signal, can be effective to partition the total capacitance of the fan-out for the purpose of reducing power or improving timing. Merging, the act of removing duplicate circuits and adding additional clock sinks to another signal, can be used to remove extra clock gating elements and shield more buffers in the clock tree and possibly improve power consumption.

An estimate of the relative insertion delays at clock gate clock inputs versus flip-flop inputs can be generated early. The early estimate of relative insertion delays allows enable functions to be modified, remapped, or rejected based upon the timing slack in an enable path.

A modification for example is to select for some reason a different function that may be a more active function with less power efficiency. Traditionally, logic synthesis of the clock tree network is complete such that modifications cannot be made. Cloning, a modification to the clock tree network, may also be used to reduce the per-driver load and buffering delay to the clock sink, thereby allowing the enable signal to arrive later in the clock cycle but still meet timing requirements. Modifications to the clock tree network allows the enable logic network to be mapped without overly critical enable paths, thereby reducing the area and power consumption of the clock tree network.

In FIG. 2, clock tree synthesis 200 includes the processes of de-clock gating 202, a functional analysis process 204, a clock tree topology planning process 206, an incremental optimization process 208, and an implementation process 210.

During the de-clock gating process 202 the enable functions that are used to generate gated clock signals are identified and stored in a clock tree planning data base.

During functional analysis 204, the RTL logic of the IC design is analyzed to identify additional enable signals that may be used to generate gated clock signals.

During the clock tree planning process 206, an initial placement of enable gates, clock gates and flip-flops forming flip-flop clusters may be performed. Embodiments of the clock tree planning GUI described further herein may be used to evaluate the initial placement and make changes as may be desired.

During the incremental optimization process 208, the clock tree topology is incrementally optimized in response to changes that are desired from the clock tree planning process 208.

During the implementation process 210, the clock tree topology is mapped into the gates (e.g., the enable gates, clock gates, buffers, and flip-flops) that are also placed into the layout of the integrated circuit design.

Figure 3:
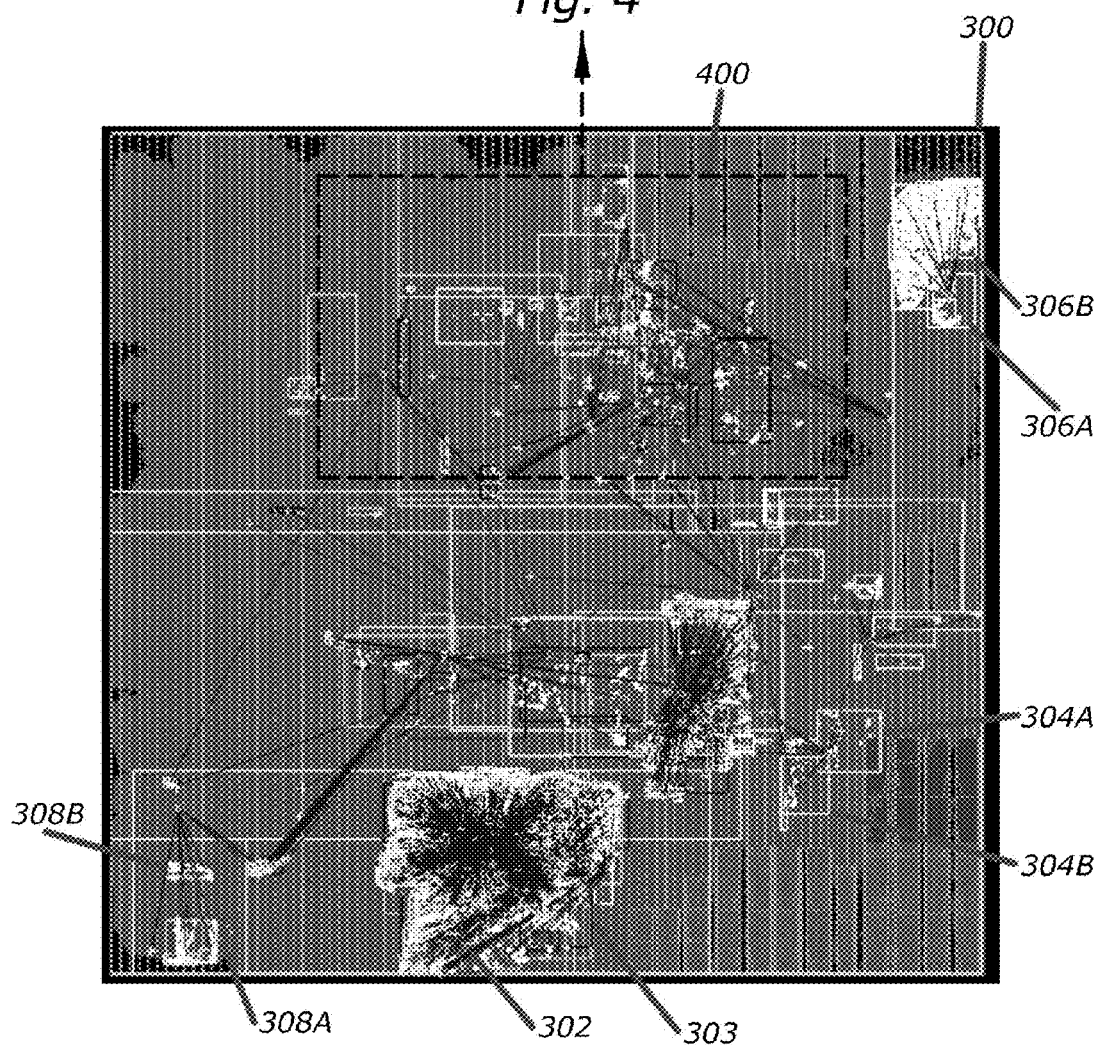

Referring now to FIG. 3, a layout view window 300 of the graphical user interface is shown. The graphical user interface can be interactively used in clock tree planning to visually depict results thereof. The layout view window 300 illustrates a portion of the physical layout of the integrated circuit design. The layout view window 300 can illustrate colorized air lines (enable air lines, clock air lines, center of mass air lines) 302 to show linear distances between enable gates and clock gates (enable air lines), linear distances between clock gates and flip-flops (clock air lines), as well the linear distance between clock gates and a center of mass of clocked flip-flops (center of mass air lines). The clock airlines display the overall connectivity between a clock gate and its fan-out flops.

Within a functional block, such as block 303, enable air lines may be colored different from clock air lines and center of mass lines so they are distinguishable from each other. Flip-flops clocked by gated clock signals with different enables have different colored clock air lines. Flip-flops clocked by gated clock signals with the same enable signal have similar colored clock air lines. Clock gates controlled by the same enable signal (e.g., EN1 enable signal) have similar colored enable air lines. Clock gates controlled by different enable signals (e.g., EN1 and EN2 enable signals) have different colored enable air lines. Alternatively, flip-flops clocked by gated clock signals with different clock signals (e.g., CLK1 and CLK2 clock signals) may have different colored clock air lines. Flip-flops clocked by gated clock signals with the same clock signal (e.g., CLK2 clock signal) may have similar colored clock air lines.

Clusters of one or more flip-flops or registers clocked by the same gated clock signal may have a colored box placed around them to show that they are activated to capture data with the same clock signal. For example, cluster box 304A has a pink color to indicated the cluster of the one or more flip-flops may be clocked directly by a clock signal without it being gated by an enable signal. Similarly colored cluster boxes in the layout view, such as cluster box 304B, may indicate another cluster of flip-flops or registers that are similarly clocked. As another example, considered cluster box 306A that has yellow color to indicate that the cluster of the one or more flip-flops may be clocked by a gated clock signal that is enabled by an EN1 enable signal. Similarly colored cluster boxes in the layout view, such as cluster box 306B, may indicate another cluster of flip-flops or registers that are clocked in a similar manner by a gated clock signal that is enabled by an EN1 enable signal. As yet another example, considered cluster box 308A that has red color to indicate that the cluster of the one or more flip-flops may be clocked by a gated clock signal that is enabled by an EN2 enable signal. Similarly colored cluster boxes in the layout view, such as cluster box 308B, may indicate another cluster of flip-flops or registers that are clocked by a gated clock signal that is enabled by an EN2 enable signal.

An input device to a computer system, such as a mouse, may be used to select an area within the layout of the IC design shown in the layout view 300 for magnification.

Referring now to FIG. 4, a portion 400 of the IC design shown in layout view 300 is magnified in a layout window 400. FIG. 4 better illustrates various cluster or bounding boxes around respective flip-flop clusters.

The flip-flops in each flip-flop cluster of each cluster box is clocked by a single clock gate. For example, the cluster box 402A illustrated by a white rectangle surrounds a flip-flop cluster of one or more flip-flops that are driven by a single clock gate. That is, a single clock gate has an output that is coupled into each clock input of all of the one or more flip-flops that are within the given flip-flop cluster.

The flip-flops in each flip-flop cluster of similarly colored cluster boxes are clocked by a gated clock signal that is enabled by the same enable function. Thus, cluster boxes illustrated by white rectangles have flip-flops therein that are similarly clocked by a gated clock signal with the same enable signal or the same clock signal. Cluster boxes illustrated by different colored rectangles have flip-flops therein that are clocked differently.

For example, consider the cluster boxes 402A-402B illustrated by white rectangles. The cluster boxes 402A-402B each surround flip-flop clusters of one or more flip-flops that are clocked by a gated clock signal that is enabled by the same enable signal. The cluster boxes 404A-404C and 406A-406B have rectangles of a different color than that of cluster boxes 402A-402B. The cluster boxes 404A-404C illustrated by red rectangles and the cluster boxes 406A-406B illustrated by purple rectangles surround clusters of one or more flip-flops that are clocked differently than the flip-flops in cluster boxes 402A-402B.

Referring momentarily to FIGS. 7A-7B, the size (height and width) or area of each cluster or bounding box and the flip-flop fan-out is proportional to the capability of balancing timing during a clock period 700 of a clock signal between the enable signal generation/receipt and clock gate/buffer (CG) placement with respect to the enable gate (EG). In a layout view window, the GUI may display each bounding box of each flip-flop cluster with a size representing a level of capability of the respective clock and enable gates for balancing timing during a clock period and its respective level of fan-out capability. In FIG. 4 for example, cluster box 402A is small in size compared to the size of cluster box 404B. Thus, the respective clock gates and enable gates of cluster box 404B can balance timing better than the respective clock gates and enable gates of cluster box 404A. Accordingly, the respective clock gates and enable gates of cluster box 404B can driver a greater fan-out load than the respective clock gates and enable gates of cluster box 404A.

FIGS. 7A-7B illustrate that the sooner an enable signal 702A is generated by the EG and received by the CG, the more time in the clock period there is for the CG to generate a gated clock signal and drive a larger fan out of flip-flops. The clock gate is usually positioned in a flip-flop cluster, such as illustrated in FIGS. 7A-7B, in order to centrally drive the flip-flops in the cluster and balance the gated clock signal delays from the CG to the flip-flops within the cluster. However, the clock gate may also be positioned outside a flip-flop cluster if it improves the balance of the gated clock signal delays from the CG to the flip-flops within the cluster.

In FIG. 7A, an enable signal is generated by the EG 708A and is sent a short distance to the CG 702A. An enable air line 732A is coupled between X-Y placement coordinates of the EG 708A and the CG 702A to display on a display device the short distance (enable distance Den) between them. Thus, the enable signal is available at an early time 730A within the clock period Tp 700 along the time line illustrated in FIG. 7A. Ample time remains in the clock period Tp 700 for the clock gate CG to drive a larger fan out of flip-flops 704 that may be spread out in the flip-flop cluster 706A. A center of mass line 728A coupled between a center of mass coordinate 716A and the placement coordinate of the clock gate GC 702A may be displayed on a display device to illustrate a center mass distance Dcm.

How much fanout a clock gate CG can drive is dependent on the setup slack time that is available at the enable pin (driven by the enable gate EG) of the clock gate CG. If the setup slack time is positive, more time is available than required by clock gate CG gate to receive the enable signal correctly, and more fanout can be driven by the clock gate CG. If the setup slack time is negative, an insufficient time is available for the clock gate CG gate to receive the enable signal correctly, a smaller fanout load is desirable on the clock gate CG. In this case, the clock gate may be mirrored to reduce the fanout load on each.

Whether a clock gate CG can drive more or less fanout load (e.g., the number of clock inputs to flip-flops) on its output may be visually displayed within the user interface by a tag being appended to the clock gate. The tag may display the setup slack time value in picoseconds (ps), for example. The tag may be applied next to the clock gate CG with a bubble or overlaid on top of the clock gate CG. If the slack time is positive or zero, the tag and the time value may be displayed with a green color for example. If the slack time is negative, the tag and the time value may be displayed with a red color for example. In this manner, attention may be drawn to the user/designer to the slack time that is negative.

For planning purposes, knowing the clock period, the center mass distance may be estimated from the enable distance Den and/or enable time delay to determine the size of a flip-flop cluster and the number of flip-flops therein. With placement of the flip-flops in the flip-flop cluster, an actual center of mass can be calculated from the average of their placement coordinates as described further herein.

After the flip-flops 704 are placed within the flip-flop cluster 706, gated clock signal airlines 733 may be displayed on a display device between the X-Y placement coordinates 712A of the clock gate CG 702A and the X-Y placement coordinates 714 of each flip-flop 704 in the cluster 706A. The display of the gated clock signal airlines 733 can illustrate how well the timing is balanced between the flip-flops 704 in the cluster 706.

In FIG. 7B, an enable signal is generated by the EG 708B. The enable signal must propagate a longer distance to the position of the clock gate CG 702B. An enable air line 732B is coupled between X-Y placement coordinates of the EG 708B and the CG 702B to display on a display device the short distance (enable distance Den) between them. The enable distance Den between the EG 708B and the CG 702B is greater than the enable distance between the EG 708A and the CG 702A. Thus, the enable signal must travel further to the clock gate CG 702B. Assuming the enable gate generates the enable signal at the same time or it's the same enable signal, the enable signal is available at the clock gate 702B at a later time 730B within the clock period Tp 700 along the time line illustrated in FIG. 7B. Accordingly, much less time remains in the clock period Tp 700 for the clock gate CG 702 to drive a fan out of flip-flops 704 that are closer together in the smaller flip-flop cluster 706B.

Thus, an enable signal routed a longer distance from the enable gate to the clock gate causes the clock gate to have a smaller fan out with fewer flip-flops to drive and thus, a smaller flip-flop cluster. Conversely, an enable signal routed a shorter distance from the enable gate to the clock gate allows the clock gate to have a larger fan out with more flip-flops to drive and thus, a larger flip-flop cluster.

Referring momentarily to FIGS. 6A-6B, a functional block diagram of exemplary circuits 600 is illustrated to better explain the graphical objects shown in the layout view windows of FIGS. 3-5. The exemplary circuits 600 includes a plurality of clock gates 602A-602D, a plurality of flip-flops 604A-604G, and a plurality of enable gates 608A-608B coupled together as shown.

The flip-flops in each flip-flop cluster of each cluster box is clocked by a single clock gate. That is, the flip-flops in a flip-flop cluster are all clocked by the same gated clock signal. Flip-flops that are gated by the same clock signal are typically placed close to each other to balance timing delays and form a flip-flop cluster. For example, flip-flops 604A-604F clocked by the gated clock signal 603A generated by the clock gate 602A may be clustered together into the flip-flop cluster 606A. Flip-flops 604G-604P clocked by the gated clock signal 603B generated by the clock gate 602B are placed near each other and form the flip-flop cluster 606B. Flip-flops 604Q-604R clocked by the gated clock signal 603C generated by the clock gate 602C are placed near each other to form the flip-flop cluster 606C. Flip-flops 604S-604T, clocked by the gated clock signal 603D forms the flip-flop cluster 606D.

Each of the flip-flop clusters may be bounded by a bounding box or rectangle (also referred to as a cluster box) as shown in FIGS. 6A-6B. The bounding boxes of the flip-flop clusters having the same enable signal may be colored with the same color. For example, the flip-flops in the flip-flop clusters 606A, 606B, and 606C are all clocked respectively by gated clock signals 603A, 603B, and 603C that are enabled by the same enable signal, EN1 630A.

Accordingly, the boundary or cluster boxes in the GUI representing the flip-flop clusters 606A, 606B, and 606C may all be colored with the same color, such as clusters 404A, 404B, and 404C for example that are illustrated by red colored rectangles in FIG. 4.

The flip-flops in the flip-flop cluster 606D are all clocked by a different gated clock signal 603D that is enabled by a different enable signal, EN2 630B. Accordingly, the boundary or cluster box in the GUI representing the flip-flop cluster 606D may be colored with a different color than the color of the bounding boxes for clusters 606A, 606B and 606C, such as cluster 402A for example that is illustrated by a white colored rectangle in FIG. 4. In this manner, flip-flops that may switch together are illustrated in the GUI by the similar color of the boundary or cluster boxes for the flip-flop clusters.

The exemplary circuits 600 include a clock subtree 601 between clock gates 602A-602D and flip-flops 604A-604G. The exemplary circuits 600 further include enable gates 608A, 608B generating enable signals EN1 630A and EN2 630B. The clock gates 602A and 602C-602D each receive the CLK1 signal 620A. The clock gate 602B receives the CLK2 signal 620B. The clock gates 602A, 602B and 602C further receive as an input the EN1 signal 630A. The clock gate 602D further receives as an input the EN2 signal 630B. The clock gates 602A-602D are illustrated as being an AND gate but may be any other Boolean logic gate. The enable gates 608A-608B are illustrated as being a NOR gate but can be any other Boolean logic gate.

Each of the clock gates 602A-602D generate the gated clock signal 603A-603D, respectively. The gated clock signals 603A-603D are coupled into the clock input of flip-flops in order to clock data into each when enabled. The gated clock signal 603A is coupled into the clock input of flip-flops 604A-604F. The gated clock signal 603B is coupled into the clock input of the flip-flops 604G-604P. The gated clock signal 603C is coupled into the clock input of the flip-flops 604Q-604R. The gated clock signal 603D is coupled into the clock input of the flip-flops 604S-604T.

Reference is now made to FIGS. 5A-5B and 6A-6B. The layout windows 500A,500B shown in FIGS. 5A,5B are further magnified views of portions of an IC design that may be displayed by the user interface. FIGS. 5A-5B better illustrate enable air lines and clock air lines in and around the flip-flop clusters. In a layout window, clock air lines may be distinguishable from enable air lines and center of mass lines by using different colored lines. Depending upon zoom or magnification, air lines may have colored arrow heads (e.g., yellow arrow heads) added to further distinguish one type of airlines from another.

The color of boundary rectangles or boundary boxes around respective flip-flop clusters may be used to distinguish flip-flop clusters of flips flops with a clock enable provided by different enable signals. The same colored rectangles or boundary boxes around respective flip-flop clusters indicate clusters enabled with the same enable signal. For example, consider the flip-flop clusters 506A-506C illustrated in FIG. 5A. Substantially all the enable air lines 531A are generated by the same enable gate (possibly buffered by a buffer gate) and enable signal. That is, a single enable signal fans out to multiple clock gates. The enable air lines 531A are illustrated by a plurality of black colored lines routing to the clock gates of each respective flip-flop cluster. For example, each rectangle representing the extent of the flip-flop cluster 506A-506C has a blue color representing that it is enabled by the same enable signal.

Different colored rectangles or boundary boxes around respective flip-flop clusters indicate clusters enabled to be clocked by different enable signals. In FIG. 5B for example, the rectangle representing the extent of the flip-flop cluster 506D enabled by one enable signal has a blue color while the rectangle representing the extent of the flip-flop cluster 506E enabled by a different enable signal has a green color.

Clock air lines of the same color in a local area of a given flip-flop cluster are routed from the same clock gate to the flip-flops within the given cluster. However, the clock airlines for neighboring flip-flop clusters may differ. For example in FIG. 5A, clock air lines 538A of flip-flop cluster 506A are displayed with red colored lines. Clock air lines 538B of neighboring flip-flop cluster 506B are displayed with yellow colored lines. Clock air lines 538C of neighboring flip-flop cluster 506C are displayed with green colored lines.

Different colored clock air lines for the different clusters can be used to generally indicate the quality of the clock network. That is, for the same enable signal, clock air lines of different clock gates in different locations may be colored with different colors so as to highlight the quality of the clock network. For the same enable signal, if there are a substantial number of clock airlines of different colors that overlap, then the quality of the clock network may be generally of poor quality in that area. If there is little overlap of different colored airlines, then the quality of the clock network may be generally of high quality in that area. Consider FIG. 5A, for example. For the same enable signal illustrated by the same colored enable airlines 232 and the same colored rectangles, there is little to no overlap of the different colored clock air lines (e.g., clock air lines 538A,538B,538C) in FIG. 5A. This generally indicates a high quality clock network.

In FIGS. 6A-6B, each of the enable gates 608A, 608B, clock gates 602A-602D, and flip-flops 604A-604D have been initially placed within a trial layout (i.e., a trial placement) for an integrated circuit design and have X,Y placement coordinates. The initial placement may be based on an automatic synthesis of a clock distribution network as is described in U.S. Pat. No. 8,205,182 issued on Jun. 19, 2012; or alternatively the placement may be provided by the clock tree planning further described in U.S. patent application Ser. No. 13/844,683 entitled CLOCK TOPOLOGY PLANNING FOR REDUCED POWER CONSUMPTION and filed by Ankush Sood et al. on Mar. 15, 2013. The enable gates 608A-608B, each have coordinates 618A-618B respectively within the trial placement for the layout of the integrated circuit. The clock gates 602A-602D respectively have initial coordinates 612A-612D within the trial placement of the layout for the integrated circuit. The flip-flops 604A-604G each have respective coordinates 614A-614G, within the trial placement of the layout for the integrated circuit.

Each of the flip-flop clusters, 606A-606D has a center of mass coordinate 616A-616D. The center of mass coordinate 616A-616D of the cluster may be determined by averaging the X-Y coordinates 620A-614G of each flip-flop within the respective cluster. The center of mass of a flip-flop cluster may be calculated by summing the values of the respective coordinates of the flip-flops in the respective cluster together and dividing by the number of flip-flops in the respective cluster.

For example, the X coordinates of each flip-flop within a cluster are summed together (SumX) and divided by the number of flip-flops (N) within the cluster to get the X coordinate for the center of mass. Similarly, the Y coordinate for the center of mass may be computed by summing together the Y coordinates (SumY) of each flip-flop within a cluster and dividing by the number of flip-flops (N) within the respective cluster. For example, flip-flop 604A may have X,Y coordinates of 10, 12 while flip-flop 604B may have the X,Y coordinates of 10, 10 in the cluster 606A. In this case, the center of mass 616A would have an X coordinate of 20 divided by 2, or 10. Continuing with the example, the center of mass 616A would have an Y coordinate of 22 divided by 2, or 11.

Flip-flop cluster 606D with a single flip-flop 604G within its cluster would have a cluster center of mass equivalent to the coordinates of the flip-flop 604G. That is, the coordinates of the cluster center of mass 616D is equal to the flip-flop coordinates 614G of the flip-flop 604G.

Before the interconnect wires for the gated clock signals 603A-603D and the interconnect for the enable signals 630A-630B are formed, it is desirable to gain a measure of the placement of the enable gates, the clock gates, and the flip-flops within each cluster. To that end, enable airlines and clock airlines may be generated during clock tree planning in advance of placement and routing to show the distance of separation respectively between enable gates and clock gates, as well as from clock gates to flip-flops. Displaying the airlines within window of a graphical user interface can visually provide perspective of the parasitic capacitance and parasitic resistance of a wire interconnect and thus the delay of the respective signals propagating along it. In this manner, excessive parasitics and time delay may be visualized by a user and corrected before the clock tree synthesis, final gate placement, and routing of any interconnect.

FIG. 6A illustrates the exemplary circuits 600 with enable air lines 631A-631D and clock center of mass air lines 632A-632D. The enable air lines 631A-631D are respectively coupled between X-Y coordinates 618A-618D of the enable gates 608A-608D and the X-Y coordinates 612A-612D of the clock gates 602A-602D. The clock center of mass air lines 632A-632D are respectively coupled between the X-Y coordinates 612A-612D of the clock gates 602A-602D and X-Y coordinates of the centers of mass 613A-613D.

The enable air lines 631A-631D may be displayed with a first color while the clock center of mass air lines 632A-632D may be displayed with a second color differing from the first color. For example, consider the flip-flop cluster 506E illustrated in FIG. 5B. The enable air line 531B is illustrated by a blue colored line. A clock center of mass air line 532 is illustrated with a different color, such as by a green colored line. An enable air line may include a colored arrow head to distinguish it from the clock center of mass line. Boundary boxes or rectangles representing clusters of flip-flops may have the same color for those clocked by gated clock signal that is enabled by the same enable signal. For example, clusters 506D and 506E have green colored boundary boxes to indicated they are clocked by a gated clock signal generated by the same enable signal. The clock center of mass lines within clusters may have the same color (e.g. green) for those clocked by a gated clock signal that is enabled by the same enable signal. Clock center of mass lines with different colors may indicate different gated clock signals generated by different enable signals.

Clock air lines (not shown in FIG. 5B) are air lines from clock gate coordinates to coordinates of the flip-flops, and may be illustrated with a third color of lines differing from the first and second color lines.

Enable air lines routed to clock gates that are enabled by a different enable signal than that of the enable air lines 531B, may be displayed with a different color of line. Clock center of mass air lines may be represented by the same color as the flip-flop cluster bounding box. Clock air lines routed from the same clock gate CG are displayed with the same color lines. In this manner, the same colored lines indicate the flip-flops in the clusters that may actively change state together and locally consume power.

FIG. 6B illustrates the exemplary circuits 600 with enable air lines 631A-631D and clock air lines 638A-638D. The clock air lines 638A-638D may be used after placement of the flip-flops 604 and their X-Y coordinates 614 are known.

As mentioned previously, the enable air lines 631A-631D are respectively coupled between X-Y coordinates 618A-618D of the enable gates 608A-608D and the X-Y coordinates 612A-612D of the clock gates 602A-602D. For cluster 606A, the clock air lines 638A are respectively coupled between the X-Y coordinate 612A of the clock gate 602A and X-Y coordinates 614A-614F of the respective flip-flops 604A-604F. For cluster 606B, the clock air lines 638B are respectively coupled between the X-Y coordinate 612B of the clock gate 602B and X-Y coordinates 614G-614P of the respective flip-flops 604G-604P. For cluster 606C, the clock air lines 638C are respectively coupled between the X-Y coordinate 612C of the clock gate 602C and X-Y coordinates 614Q-614R of the respective flip-flops 604Q-604R. For cluster 606D, the clock air lines 638D are respectively coupled between the X-Y coordinate 612D of the clock gate 602D and X-Y coordinates 614S-614T of the respective flip-flops 604S-604T.

The enable air lines 631A-631D may be displayed with a first color while the clock air lines 638A-638D may be displayed with a second color differing from the first color. Referring back to FIG. 5A and cluster 506B, the enable air line 531A is illustrated by a black colored line while the clock air lines 538B are illustrated with yellow colored lines. Cluster 506C in FIG. 5B has an enable air line 531A illustrated by a black colored line as it is generated with the same enable signal while its clock air lines 538C are illustrated with green colored lines.

With the different colored air lines, enable air lines are graphically distinguishable from the clock center of mass lines as well as the clock air lines in the layout window of the clock tree planning graphical user interface. With different colored air lines, enable air lines are graphically distinguishable from other enable air lines with differing enable signals. Similar colored clock air lines and clock center of mass lines indicate flip-flops that can change state together in the different flip-flop clusters.

The physical layout illustrated in FIG. 5A may be an optimized clock gate topology. In which case, physically-aware grouping and cloning of clock gates may be seen by the compactness of clock sub-trees. Enable timing to enable the gated clocks may be a primary problem in some designs and so the focus of a user would be to review the enable air-lines from the enable signal gate to the clock signal gate. In another design, such as a large microprocessor, a user's focus may be to review the clock air lines from the clock signal gate to the flip-flop clusters to minimize average clock network power. To that end, strong physical-awareness in the selection of clock gate placement and grouping is important to minimize the total wire length of clock nets. A toggle count file (TCF)

or other type of switching activity file may be used to re-evaluate the power savings of each enable function and to remove the overhead of any underactive clock gates that may be in a netlist.

To improve user visibility into the results of the clock topology planning approach, statistics may be generated and displayed by the GUI. The statistics can be provided into the operations that may performed on the clock gates (e.g. cloning, merging, regrouping, un-gating). The statistics are generated for a single pass of the clock topology planning. Thus, they may not include clock nets that were constructed applying atomic incremental operations. An exemplary table of statistics 156 that may be provided by the GUI is illustrated in FIG. 1D.

As shown in FIG. 1D, the table of statistics 156 may include the number of cloned clock gates, the number of merged clock gates, and the number of regrouped overlapping clock sub-trees provided by the clock tree planning, as well as the number of un-gated flip-flops that are directly clocked by a clock signal.

Methods for Clock Tree Planning GUI

Referring now to FIG. 8, a flow chart diagram depicting an exemplary process associated with the graphical user interface to display and analyze clock gate tree topology during the performance of clock tree planning. The process begins with block 800 and then goes to process block 802.

At process block 802, a bounding box of each flip-flop (FF) cluster is displayed. Each flip-flop cluster includes flip-flops that are to be clocked by the same gated clock signal. A bounding box BLANK geometric shape a such as a rectangle. The bounding boxes of flip-flop clusters having the same enable signal are colored with the same color. The bounding boxes of flip-flop clusters having different enable signals are displayed using different colors. In this manner, flip-flops in flip-flop clusters that switch together and consume power can be visually seen in the layout view window of the GUI displayed on a display device. The process then goes to process block 804 where processes 804 through 810 are repeated for every flip-flop cluster that is desired to be displayed by the display device.

At process block 804, the X-Y coordinates for a center of mass of the flip-flop cluster is calculated. In one embodiment of the invention, the coordinates of the center of mass are responsive to the placement coordinates of each flip-flop in the flip-flop cluster and they can be determined by an averaging process. In which case, an X coordinate of the center of mass of the flip-flop cluster is calculated by summing together the X coordinates of each flip-flop in the flip-flop cluster and dividing it by a total number N of flip-flops in the flip-flop cluster. The Y coordinate of the center of mass of the flip-flop cluster is similarly calculated by summing together the Y coordinates of each flip-flop in the flip-flop cluster and dividing it by the total number N of flip-flops in the flip-flop cluster.

At process block 806, the placement coordinates of the clock gate that is to drive the flip-flops in the flip-flop cluster are displayed with respect to the coordinates of the center of mass of the flip-flop cluster.

At process block 808, with a first color, first air lines with a first color are displayed from the placement coordinates of an enable signal gate to the placement coordinates of the clock gate.

At process block 810, second air lines with a second color are displayed from the placement coordinates of the clock gate to the placement coordinates of the center of mass of the flip-flop cluster. The second color differs from the first color so the different air lines are distinguishable.

As mentioned previously, processes 804 through 810 are repeated for the flip-flop clusters that are desired to be displayed in a layout view window of the GUI.

A user may further interact with the clock tree layout and the GUI by selecting an enable signal in the floor plan that is desired to analyze. In this case, all of the bounding boxes having the selected enable signal are displayed with the same color. The other bounding boxes may not be displayed or ghosted out so as to be less visible. The first air lines and the second air lines whose enable gates and clock gates are responsive to the selected enable signal are displayed but not those responsive to non-selected enable signals. In addition to the enable signal selection, a clock signal selection may be made by a user. In this case, the clusters that are to be viewed are those responsive to the selected clock signal and the selected enable signal. This allows the integrated circuit designer (the user) to focus on enable signal and clock signal design issues.

Air lines are used in the floorplan to represent the wire routes of wire interconnect in proxy because physical routing has not yet occurred with a routing software tool. The physical routing process considers many other rules, such as layout design rules.

Computing Apparatus

Referring now to back FIG. 1B, an exemplary computing system or apparatus 100 is illustrated. The exemplary computing apparatus X00 is adapted to perform electronic computer aided design (ECAD) and may be used to execute instructions or code of software programs to perform the processes or elements of the methods disclosed herein. The computing apparatus 100 includes an input device 101, such as a keyboard, mouse, Ethernet or other communications port; an output device 102, such as a monitor, speakers, a printer, communications port, or a writeable media drive; a processor 110; and a storage device 112 coupled together as shown. The storage device 112 may include one or more of a memory 114, such as a volatile memory like RAM, SDRAM, DDR, DDR2, DDR3; and a storage media 115. The storage media 115 may comprise a non-volatile memory such as a hard drive, a solid-state drive, and the like. In some embodiments, as is known in the art, the storage media may be located on another computing device across a network (not shown). Instructions may be loaded from the storage media into the memory. The processor may retrieve instructions from the storage media or memory and execute the instructions to perform the operations described herein.

Included in the storage device 112 is a set of processor executable instructions that, when executed by the processor 110 configure the computing apparatus to provide the graphical user interface in a manner consistent with the methods disclosed herein. The clock tree planning user interface and its layout windows shown in the Figures may be displayed on the output device 102, such as a monitor or a display device, in response to processor or machine readable instructions.

In one embodiment of the invention, the clock topology planning software may be part of a logic synthesis software tool (e.g., the RTL Compiler tool) whose instructions are executed by the processor. In another embodiment of the invention, the clock topology planning software may be a stand alone software tool with instructions that are executed independently by the processor.

The computing system includes a processor, a memory, a removable media drive, and a hard disk drive. The processor within the computer executes instructions stored in a machine-readable storage device such as the hard disk drive or a removable storage device (e.g., an optical medium (compact disk (CD), digital video disk (DVD), etc.), a magnetic medium (magnetic disk, a magnetic tape, etc.), or a combination of both.

When implemented in software, the elements of the embodiments of the invention are essentially the program, code segments, or instructions to perform the necessary tasks. The program, code segments, or instructions can be stored in a processor readable medium or storage device that can be read and executed by a processor. The processor readable medium may include any medium that can store information. Examples of the processor readable medium include an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc. and stored in the processor readable medium or storage device.

When implemented as an electronic computer aided design (ECAD) system, the elements of the embodiments of the invention include one or more processor to execute the program, code segments, or instructions that may be stored in a processor readable medium or storage device to perform the tasks or functions of a method or process. The one or more processors may be specifically adapted to electronic computer aided design including processing logic that may comprise hardware (e.g., circuitry, dedicated logic, etc.), software, or a combination of both.

Some portions of the preceding detailed description may have been presented in terms of algorithms and symbolic representations that perform operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities may take the form of electrical (e.g., current or voltage) or magnetic signals capable of being stored, transferred, combined, compared, and otherwise manipulated. It has proven convenient at times, principally for reasons of common usage, to refer to these signals as bits, values, levels, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, processing logic, or similar electronic computing device, that automatically or semi-automatically manipulates and transforms data represented as physical (electronic) quantities within the computer system's registers and memories into other data similarly represented as physical quantities within the computer system memories or registers or other such information storage, transmission or display devices.

Additionally, the embodiments of the invention are not described with reference to any particular programming language. It will be appreciated that a variety of programming languages may be used to implement the teachings of the embodiments of the invention as described herein.

CONCLUSION

Thus, it is seen that a system, method, and apparatus for a graphical user interface for physically aware clock tree planning are disclosed. It will be appreciated that the embodiments of the invention can be practiced by other means than that of the above-described embodiments, which are presented in this description for purposes of illustration and not of limitation. The specification and drawings are not intended to limit the exclusionary scope of this patent document. It is noted that various equivalents for the particular embodiments discussed in this description may be practice by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method for displaying and analyzing a clock gate tree topology, the method comprising:
   displaying a bounding box of each flip-flop cluster in a floor plan of an integrated circuit; and
   for each flip-flop cluster,
      calculating coordinates for a center of mass of the flip-flop cluster,
      displaying a position of a clock gate driving flip-flops in the flip-flop cluster with respect to the center of mass of the flip-flop cluster,
      displaying first air lines from an enable signal gate to the clock gate with a first color, and
      displaying second air lines from the clock gate to the center of mass of the flip-flop cluster with a second color differing from the first color;
   wherein the calculating or one or more of the displaying is performed by a processor.

2. The method of claim 1, further comprising:
   coloring bounding boxes of flip-flop clusters having a same enable signal with a same color; and
   coloring bounding boxes of flip-flop clusters having different enable signals with different colors.

3. The method of claim 2, further comprising:
   selecting an enable signal in the floor plan;
   displaying all the bounding boxes having the selected enable signal; and
   displaying the first air lines and the second air lines whose enable gates and clock gates are responsive to the selected enable signal.

4. The method of claim 2, further comprising:
   selecting a clock signal in the floor plan;
   displaying all the bounding boxes having the selected clock signal; and
   displaying the first air lines and the second air lines whose enable gates and clock gates are responsive to the selected clock signal.

5. The method of claim 2, wherein
   each flip-flop cluster includes one or more independent flip-flops each being clocked by a same clock signal;

the coordinates of the center of mass are responsive to placement coordinates of each flip-flop in the flip-flop cluster;

an X coordinate of the center of mass of a flip-flop cluster is calculated by summing together X coordinates of each flip-flop in the flip-flop cluster to generate an X sum and dividing the X sum by a total number N of flip-flops in the flip-flop cluster; and a Y coordinate of the center of mass of a flip-flop cluster is calculated by summing together Y coordinates of each flip-flop in the flip-flop cluster to generate a Y sum and dividing the Y sum by the total number N of flip-flops in the flip-flop cluster.

6. The method of claim 1, wherein
the first air lines are enable air lines; and
the second air lines are center of mass air lines.

7. The method of claim 1, further comprising:
appending a tag to each clock gate with slack time to indicate whether or not fanout load needs to be reduced or can be increased.

8. The method of claim 1, wherein
each bounding box of each flip-flop cluster is displayed with a size representing a level of capability of respective clock and enable gates for balancing timing during a clock period and driving a fan-out load.

9. An apparatus comprising:
a display device displaying
an image of a portion of an integrated circuit design in a layout view window;
first, second, and third blocks overlaid onto the image of the portion of the integrated circuit design representing a respective placement of enable gates, clock gates, and flip-flops in a clock tree network;
cluster boundaries with a first colored box around each flip-flop cluster of one or more flip-flops clocked by a gated clock signal controlled by a first enable signal;
first air lines associated with the first enable signal from coordinates of a first enable gate to coordinates of each of one or more first clock gates with a first colored line; and
center of mass air lines from coordinates of each of the one or more first clock gates to coordinates of each center of mass of each flip-flop cluster with a second colored line differing from the first colored line.

10. The apparatus of claim 9, wherein
the display device further displays
second air lines from coordinates of one first clock gate to coordinates of each flip-flop in one flip-flop cluster clocked by the one first clock gate with a third colored line differing from the first and second colored lines.

11. The apparatus of claim 10, wherein
the display device further displays
third air lines from coordinates of another first clock gate to coordinates of each flip-flop clocked in another flip-flop cluster clocked by the another first clock gate with a fourth colored line differing from the first, second, and third colored lines.

12. The apparatus of claim 9, wherein
the display device further displays
second air lines associated with a second enable signal from coordinates of a second enable gate to coordinates of one or more second clock gates with a third colored line differing from the first and second colored lines.

13. The apparatus of claim 12, wherein
the display device further displays
third air lines associated with a third enable signal from coordinates of a third enable gate to coordinates of one or more third clock gates with a fourth colored line differing from the first, second, and third colored lines.

14. The apparatus of claim 9, wherein
the display device further displays
cluster boundaries with a second colored box differing from the first colored box around each flip-flop cluster of one or more flip-flops clocked by a gated clock signal controlled by a second enable signal.

15. The apparatus of claim 14, wherein
the display device further displays
cluster boundaries with a third colored box differing from the first and second colored boxes around each flip-flop cluster of one or more flip-flops clocked by a gated clock signal controlled by a third enable signal.

16. The apparatus of claim 9, wherein
the display device further displays
a table of statistics associated with the portion of the integrated circuit design in the layout view window.

17. The apparatus of claim 9, wherein
the display device further displays
a first selection device selectable by a user to select one or more enable signals within the portion of the integrated circuit design for display in the layout view window.

18. The apparatus of claim 17, wherein
the display device further displays
a second selection device selectable by a user to select one or more clock signals within the portion of the integrated circuit design for display in the layout view window.

19. The apparatus of claim 9, wherein
the display device further displays
a first colored tag appended to each clock gate with a negative slack time to indicate a fanout load needs to be reduced.

20. The apparatus of claim 19, wherein
the display device further displays
a second colored tag different from the first colored tag appended to each clock gate with a positive slack time to indicate a fanout load may be increased.

21. A system for clock topology planning, the system comprising:
a processor to execute instructions; and
a storage device coupled to the processor, the storage device storing instructions for execution by the processor to cause the processor to
display a bounding box of each flip-flop cluster in a floor plan of an integrated circuit;
for each flip-flop cluster,
calculate a center of mass of the flip-flop cluster in response to placement coordinates of each flip-flop in the flip-flop cluster;
display a position of a clock gate driving the flip-flops in the flip-flop cluster with respect to the center of mass of the flip-flop cluster;
display first air lines from an enable signal gate to the clock gate with a first color; and
display second air lines from the clock gate to the center of mass of the flip-flop cluster with a second color differing from the first color.

22. The system of claim 21, wherein
the storage device stores further instructions for execution by the processor to cause the processor to color bounding boxes of flip-flop clusters having a same enable signal with a same color; and color bounding boxes of flip-flop clusters having different enable signals with different colors.

23. A computer readable product for clock topology planning, the computer readable product comprising:
- a non-transitory computer readable storage medium storing instructions including
- instructions to display a bounding box of each flip-flop cluster in a floor plan of an integrated circuit, and
- for each flip-flop cluster,
  - instructions to calculate a center of mass of the flip-flop cluster in response to placement coordinates of each flip-flop in the flip-flop cluster;
  - instructions to display the position of a clock gate driving flip-flops in the flip-flop cluster with respect to the center of mass of the flip-flop cluster;
  - instructions to display first air lines from an enable signal gate to the clock gate with a first color; and
  - instructions to display second air lines from the clock gate to the center of mass of the flip-flop cluster with a second color differing from the first color.

24. The computer readable product of claim 23, wherein the instructions stored in the storage device further include:
- instructions to color bounding boxes of flip-flop clusters having a same enable signal with a same color; and
- instructions to color bounding boxes of flip-flop clusters having different enable signals with different colors.

* * * * *